May 24, 1927.
T. O'BOYLE ET AL
POLISH ROD CLAMP
Filed Sept. 18, 1923
1,629,584
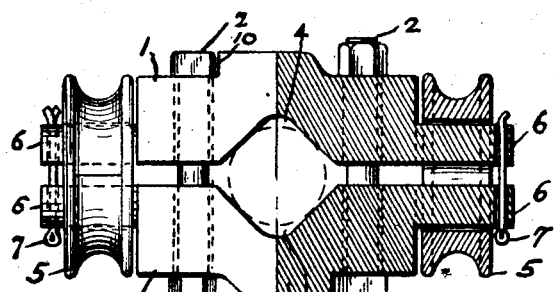
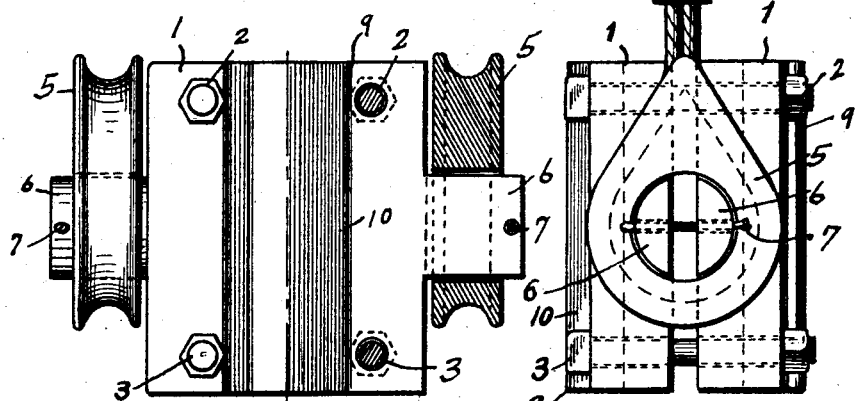
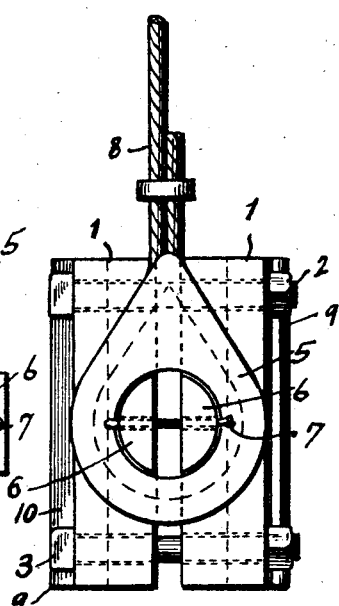
Inventors
Thomas O'Boyle
Rex G. Hamaker
By
Hardwry Cathy
Attorneys Patented May 24, 1927.

1,629,584

UNITED STATES PATENT OFFICE.

THOMAS O'BOYLE AND REX G. HAMAKER, OF HOUSTON, TEXAS; SAID O'BOYLE ASSIGNOR TO SAID HAMAKER.

POLISH-ROD CLAMP.

Application filed September 18, 1923. Serial No. 663,459.

This invention relates to new and useful improvements in a polish rod clamp.

One object of the invention is to provide a clamp of the character described which is specially designed for use in connection with a pump, particularly an oil well pump, for the purpose of connecting the polish rod of the pump to the walking beam whereby the said pump rod is reciprocated.

Another object of the invention is to provide a polish rod clamp through which the cable, which is connected to the walking beam, may be also connected to the pump rod.

A further feature of the invention resides in the provision of a clamp to which the cable may be readily connected in such a manner as not to be injured or weakened through the reciprocating movement to which it is subjected as the pump is operated.

With the above and other objects in view, the invention has particular relation to certain novel features of construction, arrangement of parts and use, an example of which is given in this specification, and illustrated in the accompanying drawings, wherein:—

Figure 1 shows a plan view of the clamp partly in section.

Figure 2 shows a side view showing one of the cable bearings in section; and,

Figure 3 is an end view.

In the drawings the numerals 1, 1, designate the clamp sections or jaws which are secured together at their upper and lower ends by means of the bolts 2, 2, and 3, 3, respectively. The inner side of each jaw has a vertical groove, as 4, said grooves coinciding when the jaws are clamped together, and forming a bearing for the polish rod, said bearing being substantially square in cross section. The sections are spaced a distance apart so that the bolt nuts may be tightened up to securely tighten the clamp on said rod. The clamp has the lateral pintles, upon which the cable bearings 5, 5, are pivoted. As shown, these pintles are formed by the half round projections 6, 6, formed integrally with each section of the clamp as clearly illustrated in Figures 1 and 3; and the cable bearings are retained on said pintles by means of suitable cotters as 7.

The construction of the walking beam through which the pump is operated is well known to those familiar with the art of pumping wells in oil fields, said walking beam being in common use. A cable is attached to the end of said walking beam, and its ends are secured around the cable bearings or sheaves 5. The cable is designated by the numeral 8 in Figure 3, and is shown applied to the sheave in Figure 3, said sheave being extended on one side and tapering, as illustrated in Figure 3, so as to form a more perfect bearing with the loop of the cable, and to conform in shape to said loop. As the walking beam is reciprocated up and down, the clamp and pump rod will be reciprocated up and down, said bearings 5 pivoting on said pintles so that the cable will be subjected at all times to only a straight pull, and will not be subjected to lateral twists and bends and weakened thereby.

The clamp sections 1 are thickened on their outer sides by the wide, vertical ribs 9, the sides of said ribs abjacent the bolt heads being formed into abrupt shoulders 10, which abut against said heads and prevent the bolts from turning when screwing the nuts thereon. These ribs also strengthen the clamp sections, at their points of greatest weakness, by being formed opposite the grooves 4.

What we claim is:

1. A polish rod clamp including a pair of clamp jaws, one side of each jaw being provided with a vertical groove, said grooves registering when the jaws are clamped together, and forming a bearing for the polish rod, bolts securing said jaws together, each jaw having a projection at each end, said projections cooperating when the jaws are secured together and thus forming pintles, one at each end of the jaw and a cable bearing on each pintle.

2. A polish rod clamp including a pair of clamp jaws, one side of each jaw being provided with a vertical V-shaped groove, said grooves registering when the jaws are clamped together and forming a bearing for the polish rod, bolts securing said jaws together, each jaw having a half round projection at each end, said projections cooperating when the jaws are secured together and thus forming pintles, one at each end of the jaw and a cable bearing on each pintle, said cable bearings being rotatable on said pintles and each cable bearing being grooved to form cable seats therein.

In testimony whereof we have signed our names to this specification.

THOMAS O'BOYLE.
REX G. HAMAKER.